United States Patent
Zhang et al.

(10) Patent No.: US 11,170,552 B2
(45) Date of Patent: Nov. 9, 2021

(54) REMOTE VISUALIZATION OF THREE-DIMENSIONAL (3D) ANIMATION WITH SYNCHRONIZED VOICE IN REAL-TIME

(71) Applicant: VanGogh Imaging, Inc., McLean, VA (US)

(72) Inventors: Xiang Zhang, McLean, VA (US); Yasmin Jahir, McLean, VA (US); Xin Hou, Herndon, VA (US); Ken Lee, Fairfax, VA (US)

(73) Assignee: VanGogh Imaging, Inc., McLean, VA (US)

( * ) Notice: Subject to any disclaimer, the term of this patent is extended or adjusted under 35 U.S.C. 154(b) by 0 days.

(21) Appl. No.: 16/867,196

(22) Filed: May 5, 2020

(65) Prior Publication Data
US 2020/0357158 A1 Nov. 12, 2020

Related U.S. Application Data

(60) Provisional application No. 62/843,683, filed on May 6, 2019.

(51) Int. Cl.
*G06T 13/40* (2011.01)
*G06T 15/04* (2011.01)
(Continued)

(52) U.S. Cl.
CPC ............ *G06T 13/40* (2013.01); *G06F 3/1454* (2013.01); *G06F 3/165* (2013.01); *G06T 15/04* (2013.01); *G06T 17/20* (2013.01)

(58) Field of Classification Search
CPC ......... G06T 13/40; G06T 15/04; G06T 17/20; G06T 7/30; G06T 17/00; G06T 2210/08;
(Continued)

(56) References Cited

U.S. PATENT DOCUMENTS

| 5,675,326 A | 10/1997 | Juds et al. |
| 6,259,815 B1 | 7/2001 | Anderson et al. |
| 6,275,235 B1 | 8/2001 | Morgan, III |
| 6,525,722 B1 | 2/2003 | Deering |

(Continued)

FOREIGN PATENT DOCUMENTS

| EP | 1308902 A2 | 5/2003 |
| KR | 10-1054736 B1 | 8/2011 |

(Continued)

OTHER PUBLICATIONS

Rossignac, J. et al., "3D Compression Made Simple: Edgebreaker on a Corner-Table," Invited lecture at the Shape Modeling International Conference, Genoa, Italy (Jan. 30, 2001), pp. 1-6.
Melax, S., "A Simple, Fast, and Effective Polygon Reduction Algorithm," Game Developer, Nov. 1998, p. 44-49.
(Continued)

*Primary Examiner* — Xilin Guo
(74) *Attorney, Agent, or Firm* — Proskauer Rose LLP

(57) ABSTRACT

Described herein are methods and systems for remote visualization of three-dimensional (3D) animation. A sensor of a mobile device captures scans of non-rigid objects in a scene, each scan comprising a depth map and a color image. A server receives a first set of scans from the mobile device and reconstructs an initial model of the non-rigid objects using the first set of scans. The server receives a second set of scans. For each scan in the second set of one or more scans, the server determines an initial alignment between the depth map and the initial model. The server converts the depth map into a coordinate system of the initial model, and determines a displacement between the depth map and the initial model. The server deforms the initial model to the depth map using the displacement, and applies a texture to at least a portion of the deformed model.

24 Claims, 5 Drawing Sheets

(51) Int. Cl.
*G06F 3/16* (2006.01)
*G06T 17/20* (2006.01)
*G06F 3/14* (2006.01)

(58) Field of Classification Search
CPC ............... G06T 19/20; G06T 7/70; G06T 2207/10028; G06T 2219/2016; G06T 19/00; G06F 3/165; G06F 3/1454; G06F 3/147; G06F 3/14; G06F 3/16; G06F 3/04815; G06F 13/00; G06F 16/22; G06F 16/2379; H04N 21/00; G09G 2370/022; G09G 2354/00
See application file for complete search history.

(56) References Cited

U.S. PATENT DOCUMENTS

| | | |
|---|---|---|
| 6,525,725 B1 | 2/2003 | Deering |
| 7,248,257 B2 | 7/2007 | Elber |
| 7,420,555 B1 | 9/2008 | Lee |
| 7,657,081 B2 | 2/2010 | Blais et al. |
| 8,209,144 B1 | 6/2012 | Anguelov et al. |
| 8,542,233 B2 | 9/2013 | Brown |
| 8,766,979 B2 | 7/2014 | Lee et al. |
| 8,942,917 B2 | 1/2015 | Chrysanthakopoulos |
| 8,995,756 B2 | 3/2015 | Lee et al. |
| 9,041,711 B1 | 5/2015 | Hsu |
| 9,104,908 B1 | 8/2015 | Rogers et al. |
| 9,171,402 B1 | 10/2015 | Allen et al. |
| 9,607,388 B2 | 5/2017 | Lin et al. |
| 9,710,960 B2 | 7/2017 | Hou |
| 9,886,530 B2 | 2/2018 | Mehr et al. |
| 9,978,177 B2 | 5/2018 | Mehr et al. |
| 2005/0068317 A1 | 3/2005 | Amakai |
| 2005/0128201 A1 | 6/2005 | Warner et al. |
| 2005/0253924 A1 | 11/2005 | Mashitani |
| 2006/0050952 A1 | 3/2006 | Blais et al. |
| 2006/0170695 A1 | 8/2006 | Zhou et al. |
| 2006/0277454 A1 | 12/2006 | Chen |
| 2007/0075997 A1 | 4/2007 | Rohaly et al. |
| 2008/0180448 A1 | 7/2008 | Anguelov et al. |
| 2008/0310757 A1 | 12/2008 | Wolberg et al. |
| 2009/0232353 A1 | 9/2009 | Sundaresan et al. |
| 2010/0111370 A1 | 5/2010 | Black et al. |
| 2010/0198563 A1 | 8/2010 | Plewe |
| 2010/0209013 A1 | 8/2010 | Minear et al. |
| 2010/0302247 A1 | 12/2010 | Perez et al. |
| 2011/0052043 A1 | 3/2011 | Hyung et al. |
| 2011/0074929 A1 | 3/2011 | Hebert et al. |
| 2012/0056800 A1 | 3/2012 | Williams et al. |
| 2012/0063672 A1 | 3/2012 | Gordon et al. |
| 2012/0098937 A1 | 4/2012 | Sajadi et al. |
| 2012/0130762 A1 | 5/2012 | Gale et al. |
| 2012/0194516 A1 | 8/2012 | Newcombe et al. |
| 2012/0194517 A1 | 8/2012 | Izadi et al. |
| 2012/0306876 A1 | 12/2012 | Shotton et al. |
| 2013/0069940 A1 | 3/2013 | Sun et al. |
| 2013/0123801 A1 | 5/2013 | Umasuthan et al. |
| 2013/0156262 A1 | 6/2013 | Taguchi et al. |
| 2013/0201104 A1 | 8/2013 | Ptucha et al. |
| 2013/0201105 A1 | 8/2013 | Ptucha et al. |
| 2013/0208955 A1 | 8/2013 | Zhao et al. |
| 2014/0160115 A1 | 6/2014 | Keitler et al. |
| 2014/0176677 A1 | 6/2014 | Valkenburg et al. |
| 2014/0206443 A1 | 7/2014 | Sharp et al. |
| 2014/0240464 A1 | 8/2014 | Lee |
| 2014/0241617 A1 | 8/2014 | Shotton et al. |
| 2014/0270484 A1 | 9/2014 | Chandraker et al. |
| 2014/0321702 A1 | 10/2014 | Schmalstieg |
| 2015/0009214 A1 | 1/2015 | Lee et al. |
| 2015/0045923 A1 | 2/2015 | Chang et al. |
| 2015/0142394 A1 | 5/2015 | Mehr et al. |
| 2015/0213572 A1 | 7/2015 | Loss |
| 2015/0234477 A1 | 8/2015 | Abovitz et al. |
| 2015/0262405 A1 | 9/2015 | Black et al. |
| 2015/0269715 A1 | 9/2015 | Jeong et al. |
| 2015/0279118 A1 | 10/2015 | Dou et al. |
| 2015/0301592 A1 | 10/2015 | Miller |
| 2015/0325044 A1 | 11/2015 | Lebovitz |
| 2015/0371440 A1 | 12/2015 | Pirchheim et al. |
| 2016/0026253 A1 | 1/2016 | Bradski et al. |
| 2016/0071318 A1 | 3/2016 | Lee et al. |
| 2016/0171765 A1 | 6/2016 | Mehr |
| 2016/0173842 A1 | 6/2016 | De La Cruz et al. |
| 2016/0358382 A1 | 12/2016 | Lee et al. |
| 2017/0053447 A1 | 2/2017 | Chen et al. |
| 2017/0054954 A1 | 2/2017 | Keitler et al. |
| 2017/0054965 A1 | 2/2017 | Raab et al. |
| 2017/0221263 A1 | 8/2017 | Wei et al. |
| 2017/0243397 A1 | 8/2017 | Hou et al. |
| 2017/0278293 A1 | 9/2017 | Hsu |
| 2017/0316597 A1 | 11/2017 | Ceylan et al. |
| 2017/0337726 A1 | 11/2017 | Bui et al. |
| 2018/0005015 A1 | 1/2018 | Hou et al. |
| 2018/0025529 A1 | 1/2018 | Wu et al. |
| 2018/0114363 A1 | 4/2018 | Rosenbaum |
| 2018/0144535 A1 | 5/2018 | Ford et al. |
| 2018/0241985 A1* | 8/2018 | O'Keefe ............... H04N 13/261 |
| 2018/0288387 A1 | 10/2018 | Somanath et al. |
| 2018/0300937 A1 | 10/2018 | Chien et al. |
| 2018/0336714 A1* | 11/2018 | Stoyles ............... G11B 27/036 |
| 2019/0122411 A1* | 4/2019 | Sachs ............... G06T 7/248 |
| 2019/0208007 A1 | 7/2019 | Khalid |
| 2019/0244412 A1 | 8/2019 | Yago Vicente et al. |
| 2020/0086487 A1 | 3/2020 | Johnson et al. |
| 2020/0105013 A1 | 4/2020 | Chen |

FOREIGN PATENT DOCUMENTS

| | | |
|---|---|---|
| KR | 10-2011-0116671 A | 10/2011 |
| WO | 2006027339 A2 | 3/2006 |

OTHER PUBLICATIONS

Myronenko, A. et al., "Point Set Registration: Coherent Point Drift," IEEE Transactions on Pattern Analysis and Machine Intelligence, vol. 32, No. 12, Dec. 2010, pp. 2262-2275.

Bookstein, F., "Principal Warps: Thin-Plate Splines and the Decomposition of Deformations," IEEE Transactions on Pattern Analysis and Machine Intelligence, vol. 11, No. 6, Jun. 1989, pp. 567-585.

Izadi, S. et al., "KinectFusion: Real-time 3D Reconstruction and Interaction Using a Moving Depth Camera," UIST '11, Oct. 16-19, 2011, 10 pages.

Papazov, C. et al., "An Efficient RANSAC for 3D Object Recognition in Noisy and Occluded Scenes," presented at Computer Vision—ACCV 2010—10th Asian Conference on Computer Vision, Queenstown, New Zealand, Nov. 8-12, 2010, 14 pages.

Biegelbauer, Georg et al., "Model-based 3D object detection—Efficient approach using superquadrics," Machine Vision and Applications, Jun. 2010, vol. 21, Issue 4, pp. 497-516.

Kanezaki, Asako et al., "High-speed 3D Object Recognition Using Additive Features in a Linear Subspace," 2010 EEE International Conference on Robotics and Automation, Anchorage Convention District, May 3-8, 2010, pp. 3128-3134.

International Search Report and Written Opinion from PCT patent application No. PCT/US13/062292, dated Jan. 28, 2014, 10 pages.

International Search Report and Written Opinion from PCT patent application No. PCT/US14/045591, dated Nov. 5, 2014, 9 pages.

Sumner, R. et al., "Embedded Deformation for Shape Manipulation," Applied Geometry Group, ETH Zurich, SIGGRAPH 2007, 7 pages.

Rosten, Edward, et al., "Faster and better: a machine learning approach to corner detection," arXiv:08102.2434v1 [cs.CV], Oct. 14, 2008, available at https://arxiv.org/pdf/0810.2434.pdf, 35 pages.

Kim, Young Min, et al., "Guided Real-Time Scanning of Indoor Objects," Computer Graphics Forum, vol. 32, No. 7 (2013), 10 pages.

Rusinkewicz, Szymon, et al., "Real-time 3D model acquisition," ACM Transactions on Graphics (TOG) 21.3 (2002), pp. 438-446.

(56) References Cited

OTHER PUBLICATIONS

European Search Report from European patent application No. EP 15839160, dated Feb. 19, 2018, 8 pages.
Liu, Song, et al., "Creating Simplified 3D Models with High Quality Textures," arXiv:1602.06645v1 [cs.GR], Feb. 22, 2016, 9 pages.
Stoll, C., et al., "Template Deformation for Point Cloud Filtering," Eurographics Symposium on Point-Based Graphics (2006), 9 pages.
Allen, Brett, et al., "The space of human body shapes: reconstruction and parameterization from range scans," ACM Transactions on Graphics (TOG), vol. 22, Issue 3, Jul. 2003, pp. 587-594.
International Search Report and Written Opinion from PCT patent application No. PCT/US15/49175, dated Feb. 19, 2016, 14 pages.
Harris, Chris & Mike Stephens, "A Combined Corner and Edge Detector," Plessey Research Roke Manor, U.K. (1988), pp. 147-151.
Bay, Herbert, et al., "Speeded-Up Robust Features (SURF)," Computer Vision and Image Understanding 110 (2008), pp. 346-359.
Rublee, Ethan, et al., "ORB: an efficient alternative to SIFT or SURF," Willow Garage, Menlo Park, CA (2011), available from http://citeseerx.ist.psu.edu/viewdoc/download?doi=10.1.1.370.4395&rep=rep1&type=pdf, 8 pages.
Lowe, David G., "Distinctive Image Features from Scale-Invariant Keypoints," International Journal of Computer Vision, vol. 60, Issue 2, Nov. 2004, pp. 91-110.
Kaess, Michael, et al., "iSAM: Incremental Smoothing and Mapping," IEEE Transactions on Robotics, Manuscript, Sep. 7, 2008, 14 pages.
Kummerle, Rainer, et al., "g2o: A General Framework for Graph Optimization," 2011 IEEE International Conference on Robotics and Automation, May 9-13, 2011, Shanghai, China, 7 pages.

\* cited by examiner

REMOTE VISUALIZATION OF THREE-DIMENSIONAL (3D) ANIMATION WITH SYNCHRONIZED VOICE IN REAL-TIME

RELATED APPLICATIONS

This application claims priority to U.S. Provisional Patent Application No. 62/843,683, filed on May 6, 2019, the entirety of which is incorporated herein by reference.

TECHNICAL FIELD

This subject matter of this application relates generally to methods and apparatuses, including computer program products, for remote visualization of captured three-dimensional (3D) Hologram video of a live person via 3D animation with synchronized voice in real-time BACKGROUND As described in U.S. patent application Ser. No. 16/240,404, titled "4D Hologram: Real-Time Remote Avatar Creation and Animation Control" (the entirety of which is incorporated herein by reference), 4D hologram technology enables the creation and control of a real-time remote avatar, particularly over low bandwidth networks.

SUMMARY

The technology described herein advantageously builds upon the 4D hologram technology described in the above-referenced patent application to enable the use of a depth sensor in a mobile device (e.g., smartphone) to scan a human model and transmit full 3D, animated messages including the human model to a remote device (e.g., smartphone, virtual reality (VR) viewer) for display in real-time. This process includes two stages as follows:

Stage 1: 3D avatar scan and reconstruction—to obtain the 3D model of the person with texture mapping.

1) Data collection: a user of the mobile device scans his or her upper body (or another person's upper body) with a camera or other sensor embedded in the mobile device. Because non-rigid object scan technology is used for model reconstruction, the subject does not have to remain stiff and can use natural movement during the scanning process. For example, the user's head and shoulders can move relative to each other during the scanning.

2) The depth and color images captured by the mobile device are uploaded to a remote/cloud server for high-speed 3D avatar reconstruction. In some embodiments, certain types of local or network-based processing capability (e.g., edge cloud in 5G network), this could be processed on the mobile device or in a computing device closer to the mobile device than a remote server.

3) A full model with texture mapping is reconstructed using dynamic fusion. Any holes in the body can be filled up using a template body model, and textures can be extended from an available real texture.

4) The 3D model reconstruction is now completed.

Stage 2: Animation capture and display—to capture user facial and body movement, the system collects the sequence of corresponding depth and color images to animate the visualized 3D avatar, together with synchronized voice transfer.

1) The mobile device captures the sequence of depth/color images of a user, together with the user's voice.

2) Depending on the computational power of the mobile device, the captured depth and color images can either be processed locally on the mobile device or transferred to a remote/cloud server (or edge cloud processing device) for expression and animation extraction.

3) The extracted avatar animation data, together with the voice, are transmitted to a remote computing device (e.g., mobile device, VR viewer) for visualization and voice playback.

4) The remote device that receives the 4D message is presented with an animation of the 3D avatar with synchronized voice in time.

5) In some embodiments, the visualization can work with augmented reality (AR) functionality, such as ARkit™ from Apple, Inc. or ARCore™ from Google, Inc.

The invention, in one aspect, features a system for remote visualization of 3D animation with synchronized voice in real-time. The system includes a sensor device, coupled to a mobile computing device, that captures a plurality of scans of one or more non-rigid objects in a scene, each scan comprising (i) a depth map and (ii) a color image. The system includes one or more display devices, coupled to the mobile computing device, that render and animate 3D models. The system includes a server computing device coupled to the mobile computing device, the server computing device comprising a memory that stores computer-executable instructions and a processor that executes the instructions to receive a first set of one or more scans from the mobile computing device. The server computing device reconstructs an initial 3D model of the one or more non-rigid objects using the first set of one or more scans. The server computing device receives a second set of one or more scans from the sensor device. For each scan in the second set of one or more scans, the server computing device determines an initial alignment between the depth map of the scan and the initial 3D model by mapping one or more landmark points in the depth map to one or more landmark points in the initial 3D model, converts the depth map of the scan into a coordinate system of the initial 3D model, determines one or more displacement values between a location of each landmark point in the depth map and a location of the corresponding landmark point in the initial 3D model, deforms the initial 3D model to the depth map using the displacements, applies a texture to at least a portion of the deformed 3D model based upon the color image of the scan, and transmits the textured deformed 3D model and the displacement values to the mobile computing device for display on one or more of the display devices, wherein the display devices render the textured deformed 3D model and animate the textured deformed 3D model using the displacement values.

The invention, in another aspect, features a computerized method of remote visualization of 3D animation with synchronized voice in real-time. A sensor device coupled to a mobile computing device captures a plurality of scans of one or more non-rigid objects in a scene, each scan comprising (i) a depth map and (ii) a color image. A server computing device coupled to the mobile computing device receives a first set of one or more scans from the mobile computing device. The server computing device reconstructs an initial 3D model of the one or more non-rigid objects using the first set of one or more scans. The server computing device receives a second set of one or more scans from the sensor device. For each scan in the second set of one or more scans, the server computing device determines an initial alignment between the depth map of the scan and the initial 3D model by mapping one or more landmark points in the depth map to one or more landmark points in the initial 3D model, converts the depth map of the scan into a coordinate system of the initial 3D model, determines one or more displacement values between a location of each landmark point in the depth map and a location of the corresponding landmark point in the initial 3D model, deforms the initial 3D model to the depth map using the displacements, applies a texture to at least a portion of the deformed 3D model based upon the color image of the scan, and transmits the textured deformed 3D model to the mobile computing device for display on one or more display devices coupled to the mobile computing device, wherein the one or more display devices render the textured deformed 3D model and animate the textured deformed 3D model using the displacement values.

Any of the above aspects can include one or more of the following features. In some embodiments, reconstructing an initial 3D model of the one or more non-rigid objects using the first set of one or more scans comprises, for each scan in the first set of one or more scans: converting the depth map to an input 3D model point cloud; determining whether the depth map corresponds to a first scan of the first set of one or more scans; when the depth map does not correspond to a first scan, performing a non-rigid match of an existing 3D model point cloud to the input 3D model point cloud; integrating the input 3D model point cloud to a truncated signed distance function (TSDF) 3D model; generating a 3D mesh from the TSDF 3D model; deforming the 3D mesh to a coordinate system associated with the input 3D model point cloud; rasterizing the deformed 3D mesh to the existing 3D model point cloud; generating an output 3D mesh from the rasterized 3D mesh using the TSDF 3D model; and creating an initial 3D model of the one or more non-rigid objects using the output 3D mesh.

In some embodiments, converting the depth map to an input 3D model point cloud comprises projecting the depth map using a depth camera intrinsic matrix. In some embodiments, the server computing device generates a normal of each point in the input 3D model point cloud by eigen value decomposition. In some embodiments, integrating the input 3D model point cloud to a truncated signed distance function (TSDF) 3D model comprises: deforming the TSDF model to a coordinate system of the input 3D model point cloud using a deformation tree; projecting one or more TSDF voxels to the input 3D model point cloud to obtain a projection distance for each of the one or more TSDF voxels; and updating a TSDF value in each of the one or more TSDF voxels based on the corresponding projection distance. In some embodiments, generating a 3D mesh from the TSDF 3D model is based upon a marching cube algorithm.

In some embodiments, the one or more landmark points in the depth map and the one or more landmark points in the initial 3D model each correspond to one or more facial features of a person's face. In some embodiments, the one or more facial features comprise a corner of an eye or a tip of the nose.

In some embodiments, mapping one or more landmark points in the depth map to one or more landmark points in the initial 3D model is based upon an iterative closest point (ICP) algorithm. In some embodiments, applying a texture to at least a portion of the deformed 3D model based upon the color image of the scan comprises: segmenting the deformed 3D model into a plurality of portions; and applying the texture to only one portion of the deformed 3D model. In some embodiments, the texture is applied to a front face portion of the deformed 3D model.

In some embodiments, the mobile computing device comprises an audio capture device that records audio data associated with the one or more non-rigid objects during capture of the plurality of scans by the sensor device. The mobile computing device transmits the audio data to the server computing device. The server computing device synchronizes the audio data with the displacement values and transmits the synchronized audio data to the remote computing devices. The remote computing devices play the synchronized audio data when animating the textured deformed 3D model. In some embodiments, the server computing device transmits the textured deformed 3D model and the displacement values to the mobile computing device, and the mobile computing device renders the textured deformed 3D model and animates the textured deformed 3D model in real-time using the displacement values.

Other aspects and advantages of the technology will become apparent from the following detailed description, taken in conjunction with the accompanying drawings, illustrating the principles of the technology by way of example only.

BRIEF DESCRIPTION OF THE DRAWINGS

The advantages of the technology described above, together with further advantages, may be better understood by referring to the following description taken in conjunction with the accompanying drawings. The drawings are not necessarily to scale, emphasis instead generally being placed upon illustrating the principles of the technology.

DETAILED DESCRIPTION

Figure 1:
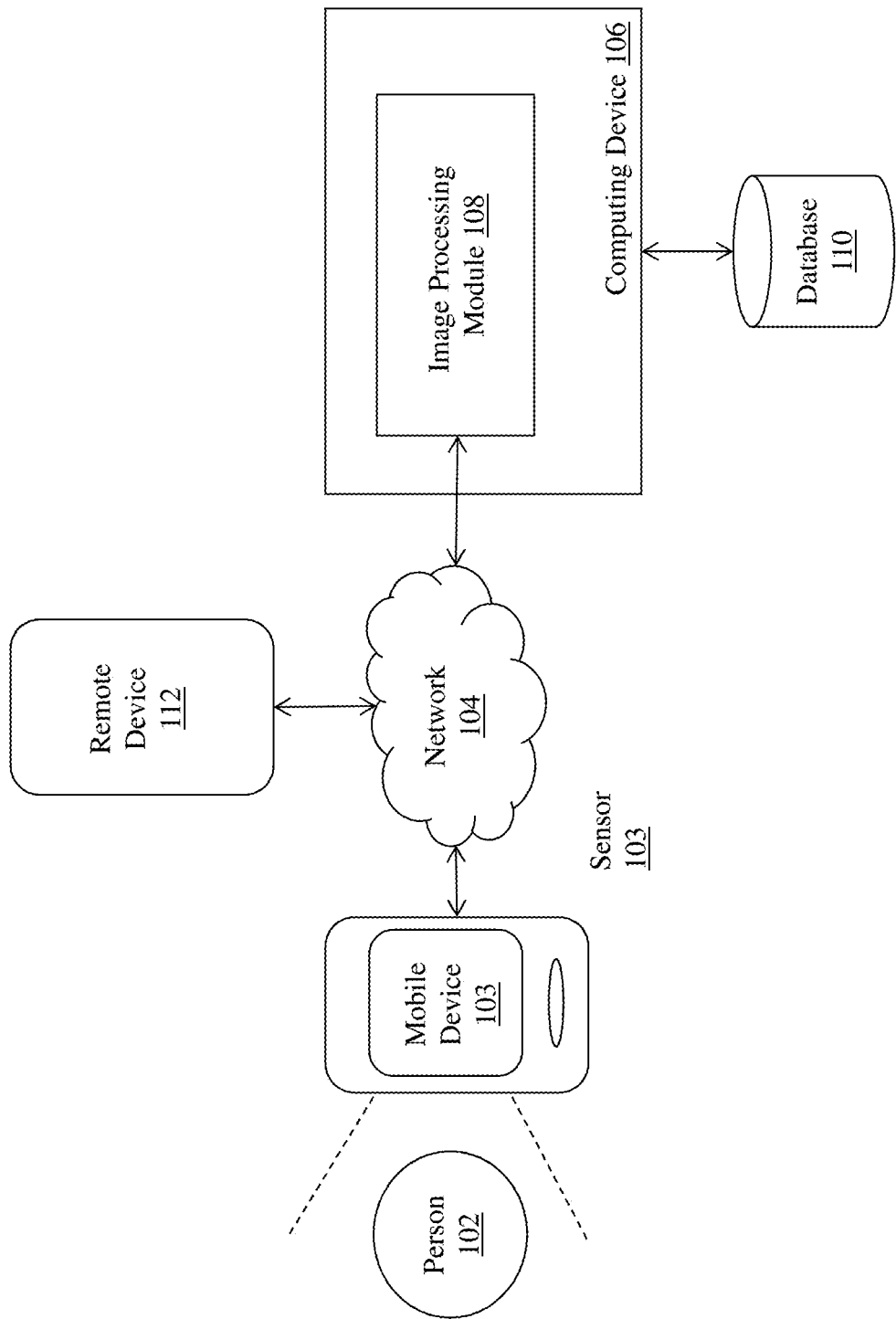
FIG. 1 is a block diagram of a system for remote visualization of three-dimensional (3D) animation with synchronized voice in real-time.

FIG. 1 is a block diagram of a system 100 for remote visualization of three-dimensional (3D) animation with synchronized voice in real-time. The system includes a mobile device 103 (e.g., a smartphone, tablet, or other type of mobile computing device) coupled to a communications network 104 that connects the mobile device 103 to a server computing device 106. The computing device 106 includes an image processing module 108. In some embodiments, the computing device 106 can also be coupled to a data storage module 110, e.g., database used for storing certain 3D models, color images, and other data as described herein. The mobile device 103 includes a camera or other sensor device (e.g., embedded in the device), which is positioned to capture images (e.g., color images) of a scene 101 which includes one or more objects (e.g., person 102). In some embodiments, the mobile device 103 includes an audio capture device (e.g., a microphone) which is configured to capture audio data (e.g., speech, ambient sounds) associated with the objects and/or the scene.

The system further includes one or more remote devices 112 coupled to the communications network 104 that enables the remote devices 112 to receive 3D models, animation data, and synchronized audio data from computing device 106 and/or mobile device 103. Exemplary remote devices include, but are not limited to, smartphones, tablets, other types of mobile computing devices, display devices (e.g., smart televisions), augmented reality (AR)/virtual reality (VR) devices (e.g., headsets, goggles), Internet-of-Things (IoT) devices, and the like). In some embodiments, the remote devices 112 can render one or more 3D models received from the computing device 106 and animate the 3D models using animation data received from the computing device 106.

The computing device 106 is a combination of hardware and software modules that includes specialized hardware and/or software modules that execute on a processor and interact with memory modules of the computing device 106, to receive data from the database 110, to transmit data to the database 110, and to communicate with the other devices of the system 100 (e.g., mobile device 103, remote device 112) in order to perform functions for remote visualization of three-dimensional (3D) animation with synchronized voice in real-time as described herein. In some embodiments, the computing device 106 is a server computing device located remotely from the mobile device 103, and coupled to the mobile device 103, e.g., via a network connection. In some embodiments, the functionality of the computing device 106, including but not limited to the image processing module 108, can be located within mobile device 103. It should be appreciated that other computing devices can be used without departing from the scope of the invention. The mobile device 103, the remote device 112 and the computing device 106 each includes network-interface components to connect to communications network 104. In some embodiments, the network-interface components include components to connect to a wireless network, such as a Wi-Fi or cellular network, in order to access a wider network, such as the Internet.

The computing device 106 receives images (also called scans) of the person 102 from the camera of the mobile device 103 and processes the images to generate a 3D model of the person represented in the scene 101. The computing device 106 includes an image processing module 108 configured to receive images captured by the mobile device 103 and analyze the images in a variety of ways, including detecting the position and location of the person 102 represented in the images and generating a 3D model of the person 102 in the images. The image processing module 108 is a hardware and/or software module that resides on the computing device 106 to perform functions associated with analyzing images capture by the scanner, including the generation of a 3D model (e.g., .OBJ files) based upon the person 102 in the images. In some embodiments, the functionality of the image processing module 108 is distributed among a plurality of computing devices. In some embodiments, the image processing module 108 operates in conjunction with other modules that are either also located on the computing device 106 or on other computing devices coupled to the computing device 106. It should be appreciated that any number of computing devices, arranged in a variety of architectures, resources, and configurations (e.g., cluster computing, virtual computing, cloud computing) can be used without departing from the scope of the invention. An exemplary image processing module 106 is the Starry Night SDK, available from VanGogh Imaging, Inc. of McLean, Va.

It should be appreciated that in one embodiment, the image processing module 108 comprises specialized hardware (such as a processor or system-on-chip) that is embedded into, e.g., a circuit board or other similar component of another device. In this embodiment, the image processing module 108 is specifically programmed with the image processing and modeling software functionality described below.

Figure 2:
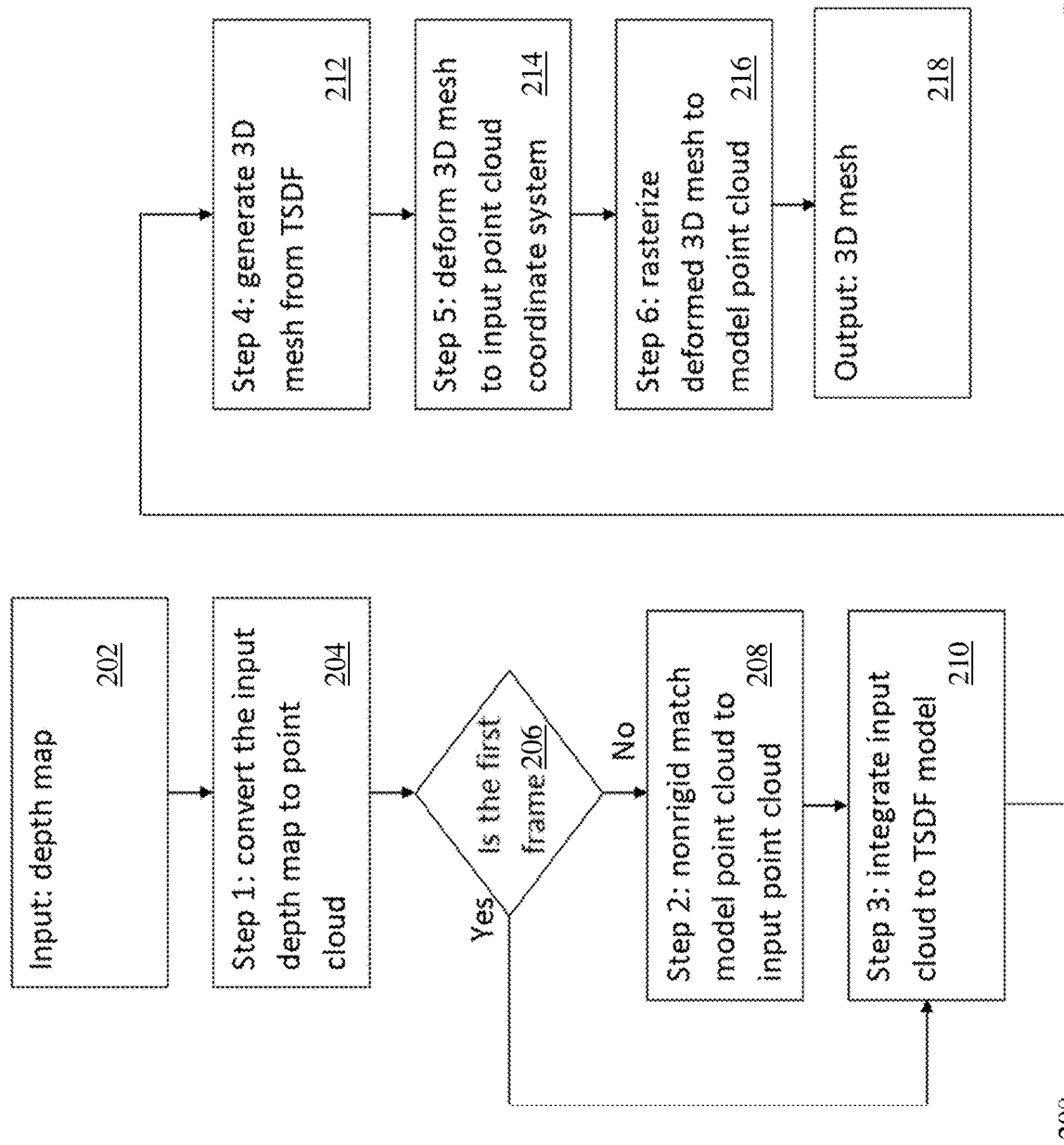
FIG. 2 is a flow diagram of a computerized method of non-rigid 3D object reconstruction with dynamic fusion for remote visualization of three-dimensional (3D) animation with synchronized voice in real-time.

FIG. 2 is a flow diagram of a computerized method 200 of non-rigid 3D object reconstruction with dynamic fusion for remote visualization of three-dimensional (3D) animation with synchronized voice in real-time, using the system 100 of FIG. 1. The mobile device 103 captures one or more scans of the person 102 in the scene 101. In some embodiments, the scans comprise a depth map of the person 102 in the scene. In some embodiments, the mobile device 102 can stream the depth map over the network 104 to the image processing module 108 of computing device 106.

The image processing module 108 receives (202) the depth map as input, and converts (204) the depth map to a point cloud. In some embodiments, the point cloud can be generated by projecting the depth map using depth camera intrinsic matrix. After the image processing module 108 generates the point cloud, the module 108 can generate the normal of each point by eigen value decomposition.

The image processing module 108 determines (206) whether the current depth map corresponds to the first frame. If so, the module 108 proceeds to step 210. If not, the module 108 performs (208) a non-rigid match of the 3D model point cloud to the input point cloud. Before the non-rigid matching step (208), the 3D model point cloud rigidly matches to the input point cloud based upon an iterative closest point (ICP) algorithm. Non-rigid matching is achieved by deforming the 3D model point cloud using a deformation tree (generated in step 212 described below). In some embodiments, the deformation tree is optimized to match the 3D model point cloud and the input point cloud. Additional details on this process are described in U.S. patent application Ser. No. 16/240,404, titled "4D Hologram: Real-Time Remote Avatar Creation and Animation Control, which is incorporated herein by reference.

The image processing module 108 integrates (210) the input point cloud to a truncated signed distance function (TSDF) model. The module 108 deforms the TSDF model to the input point cloud coordinate system using a deformation tree. Integration is achieved by projecting one or more TSDF voxels to the input point cloud and updating the TSDF value in each voxel based on the projection distance.

The image processing module 108 generates (212) a 3D mesh from the TSDF model. In some embodiments, the module 108 generates the 3D mesh from the TSDF model using a marching cube algorithm. The module 108 generates the deformation tree by uniformly down-sampling the 3D mesh. Additional details on this process are described in U.S. patent application Ser. No. 16/240,404, titled "4D Hologram: Real-Time Remote Avatar Creation and Animation Control, which is incorporated herein by reference.

The image processing module 108 then deforms (214) the 3D mesh to the input point cloud coordinate system. In some embodiments, the module 108 achieves the deformation by applying the deformation tree to the 3D mesh.

The image processing module 108 rasterizes (216) the deformed 3D mesh to the 3D model point cloud. In some embodiments, rasterization is achieved using a generic 3D graphic rendering method. The module 108 generates (218) an output 3D mesh from the rasterized 3D mesh using the TSDF model, with the same method as described above in step 212.

In order to perform texture mapping on a deformable 3D object, such as a person, the image processing module 108 can extract texture segments from multiple views and combine them to generate a texture atlas. For texturing a deformable object from multiple views:

The module 108 saves deformation trees and warp fields indicating the visibility of mesh vertices in each keyframe and uses this information later in texture segment identification for the final mesh/model.

The module 108 identifies a best single front view of the person's 102 face to cover all major facial features (e.g., eyes, nose, and mouth). This is very important to obtain a good quality and natural-looking avatar.

The module 108 performs color blending to achieve seamless texture coverage.

Figure 3:
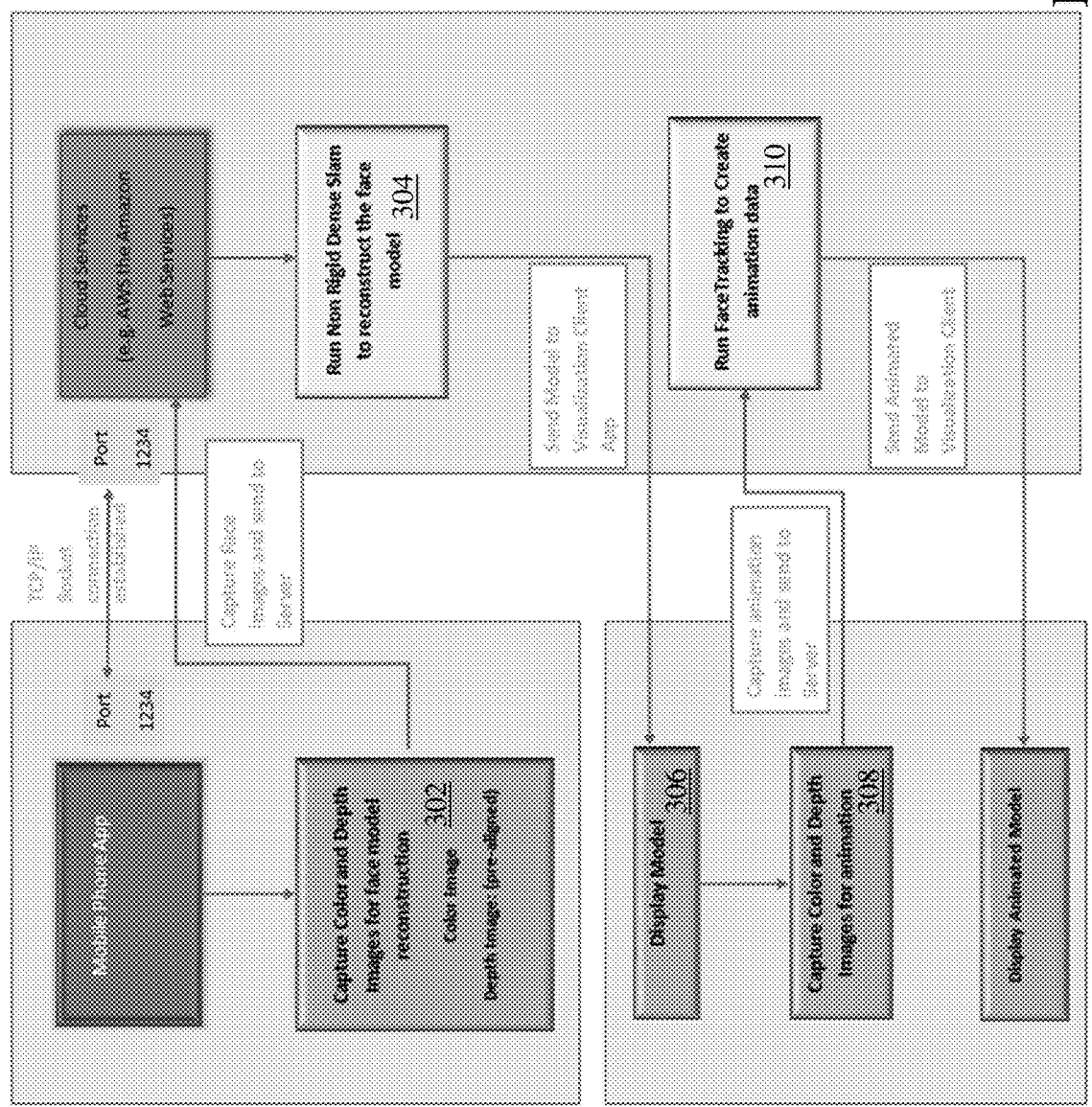
FIG. 3 is a flow diagram of a computerized method of remote visualization of three-dimensional (3D) animation with synchronized voice in real-time.

FIG. 3 is a flow diagram of a computerized method 300 of remote visualization of three-dimensional (3D) animation with synchronized voice in real-time, using the system 100 of FIG. 1. As described above with respect to FIGS. 1 and 2, an application on the mobile device 103 establishes a connection (e.g., TCP/IP socket connection) with the image processing module 108 of computing device 106 via network 104. The mobile device 103 captures (302) color (RGB) images and depth map images of a person 102 (e.g., a person's face and/or upper body) to be used in reconstructing a 3D model of the person 102. The mobile device 103 transmits the captured images to the computing device 106. The image processing module 108 of computing device 106 runs (304) non-rigid dense SLAM to reconstruct the 3D model of the person's 102 face—as described above in FIG. 2. The image processing module 108 then transmits the reconstructed 3D model to the mobile device 103 application. The mobile device 103 displays (306) the 3D model, e.g., on a display device embedded in or coupled to the mobile device 103 and/or one or more of the remote devices 112.

The sensor or camera of the mobile device 103 then captures (308) color and depth images to be used for animation of the 3D model and transmits the captured color and depth images to the image processing module 108 of computing device 106. In some embodiments, the mobile device 103 also records audio data (e.g., speech) associated with the person 102 using, e.g., an embedded microphone or other type of audio capture device, and transmits the audio data to the image processing module 108 of computing device 106. In some embodiments, the mobile device 103 synchronizes the recorded audio data with the captured color and depth images (e.g., using a timestamp matching process or frame synchronization process). For example, the mobile device 103 can determine a correlation between a timestamp of the recorded audio data and a frame number and/or timestamp of the captured color/depth images. Using the correlation, the mobile device 103 can synchronize the audio data to the captured images (e.g., by coordinating or sequencing the respective audio data and captured images). It should further be appreciated that the image processing module 108 can alternatively execute the above synchronization process instead of the mobile device 103 (e.g., due to processing or bandwidth considerations).

The image processing module 108 runs (310) face tracking to create animation data for the 3D model, as follows. The module 108 performs facial feature (landmark) tracking and alignment using the pre-scanned avatar:

Initial registration: The module 108 uses facial features (such as the corners of the eyes and the tip of the nose) to obtain an initial alignment of the incoming depth map with the 3D avatar model. Considering that a typical human expression includes deformation of the facial features, mostly the mouth and chin, the module 108 uses only the relatively less deformed face features (e.g., the inner corners of the eyes, the tip of the nose) for the initial face alignment.

Refine with ICP: The module 108 uses the alignment with ICP (iterative closest point) algorithm to map the incoming loose depth points with the pre-scanned face model. This allows the facial movements to align properly with the actual facial movement because the incoming loose depth points are coming in at 30 FPS or higher. Therefore, the facial expression looks natural and aligns well with the corresponding color texture.

The module 108 then performs 3D animation extraction and texture update. The image processing module 108 aligns the incoming loose depth map with the pre-scanned 3D model by deforming the 3D model point cloud using a deformation tree as described above. In addition, the module 108 converts the depth map into the pre-scanned model coordinate system and compares the location of facial features (landmarks) with those of the pre-scanned 3D model, to obtain the displacement of each individual facial feature. The module 108 utilizes the displacement of the facial features as the boundary condition to solve the linear system and obtain the displacement of the front face mesh vertices, where the linear system is formatted by taking the derivative of the geometric deformation energy to zero (thus, at the minimum). Such combination of mesh deformation by tracking the facial feature landmarks and the mesh deformation by non-rigid model and deformation tree ensures accurate geometric tracking and realistic 3D facial expression animation.

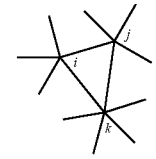

For example, if we only considers the edge extension of the mesh, the geometric deformation energy could be computed by:

$$E_{geo} = \sum_{e(i,j)} K_{ij} d_{i,j}^2 \text{ where}$$

$$d_{i,j} = |(X_i + D_i) - (X_j + D_j)| - |(X_i + X_j)|,$$

represents the geometric deformation of the mesh edge, $K_{ij}$ is the material property also determined by the length of the edge. $D_i$ is the deformation of vertex i, so $$\frac{\partial E_{geo}}{\partial D_i}$$

gives us the linear equation system to solve for the deformation of all the vertices with the given boundary conditions. The module 108 transforms the deformed mesh into the current camera frame view; and obtains the updated texture coordinates for the new texture.

Next, the module 108 performs visualization acceleration. For good FPS performance in the 3D visualization and animation, the module 108 keeps the same mesh structure, but updates only the locations of mesh vertices. To achieve realistic animation, the module 108 also updates the facial texture of each frame. Again, the module 108 segments the avatar into multiple parts, and only updates the texture of the selected component, e.g., the front face, to achieve the best FPS performance: 1) Update the front face mesh, only the location of vertices; 2) Update the front face texture, with updated texture coordinates.

The system 100 can perform data transfer acceleration. As can be appreciated, when transferring data through a wireless network or a WiFi connection, the size of data often dominates the time for data transformation. The module 108 compresses the data for transferring and the follow approaches are used to achieve data compression ratio of 1:5 to 1:10:

For vectors of char, short, or int data types, the direct lossless compression can usually reach a good compression ratio;

For vectors of float, or double, the module 108 truncates the unnecessary digits, and then converts them into integers for a better compression ratio. For example, the vertex locations are in centimeters, if we truncate 76.54321 into 76.54, then convert the truncated number to the integer 7654 with a scaling factor of 100. Lossless compression still provides an accuracy to 0.1 mm. This is good enough for the hologram visualization technique described herein.

For images, stored as matrix of 8-bit char, the image processing module 108 can directly apply in-memory conversion to JPEG to obtain a good image with very good compression ratio.

The module 108 can perform fast texture color blending, e.g., fast Poisson's blending applied for each updated texture to make sure of natural and smooth visualization of facial expressions. Turning back to FIG. 3, the image processing module 108 transmits the animated 3D avatar model to the mobile device 103 (or in some embodiments, to mobile device 110) for display. In addition, as mentioned above, the system 100 can perform voice capture, transfer, and playback: Voice is captured (e.g., by mobile device 103) in real-time and synchronized with the incoming depth and color images. The voice data can then be played back along with the animation on mobile device 103 and/or remote devices 112.

Figure 4:
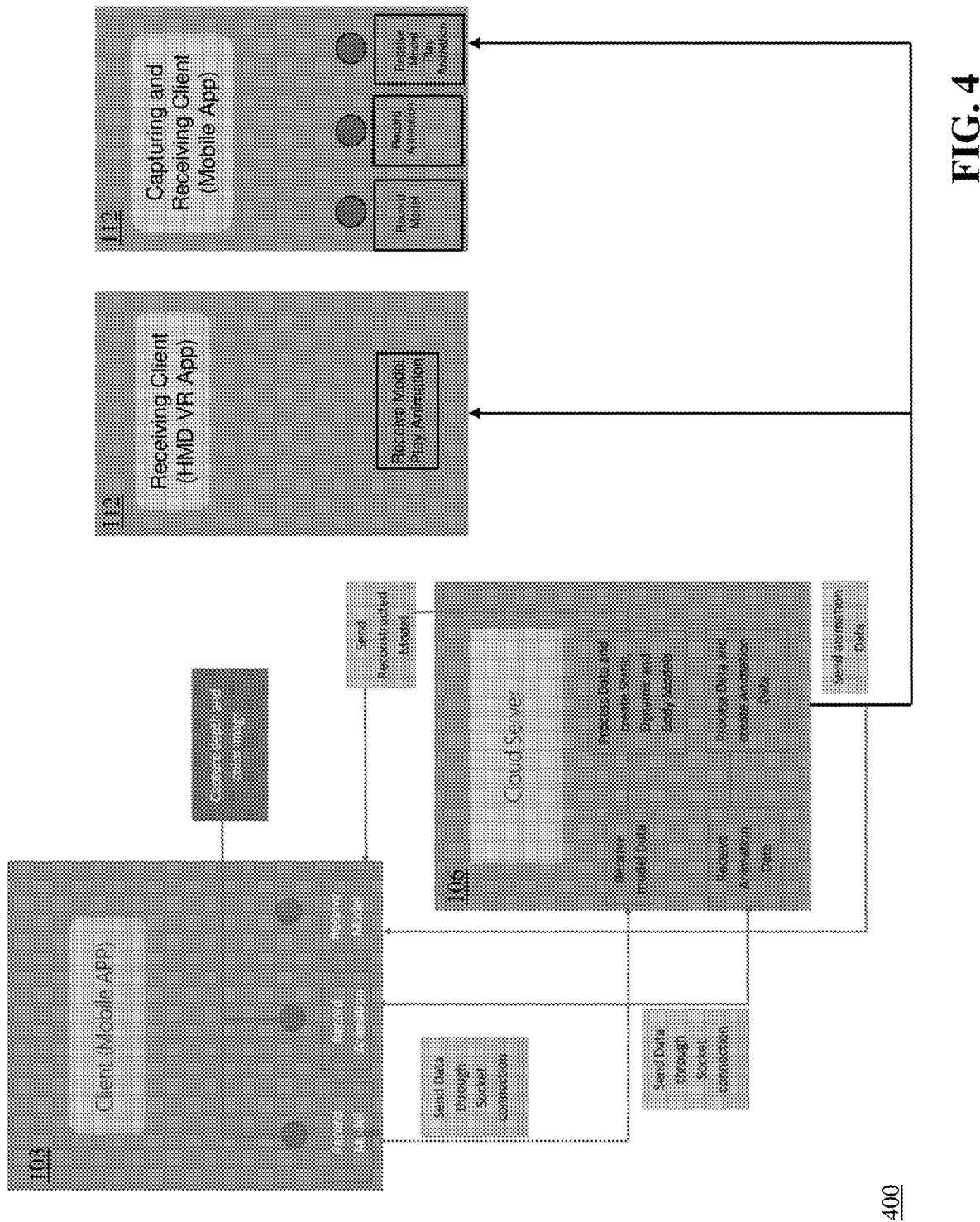
FIG. 4 is a flow diagram of a data flow for the computerized method of remote visualization of three-dimensional (3D) animation with synchronized voice in real-time.

FIG. 4 is a flow diagram showing the data flow of the method of FIG. 3. As shown in FIG. 4, the mobile device 103 connects to the computing device 106 via a socket connection in order to provide data (e.g., depth images, color images) to the computing device 106 for generation of a textured, animated 3D avatar model as described herein. In an animation session, the mobile device 103 connects to the computing device 106 in order to provide data to the computing device 106 for extract the 3D animation data, that will be sent to one or more remote devices 112 for display in real-time or, in some embodiments, for replay as previously recorded data.

Figure 5:
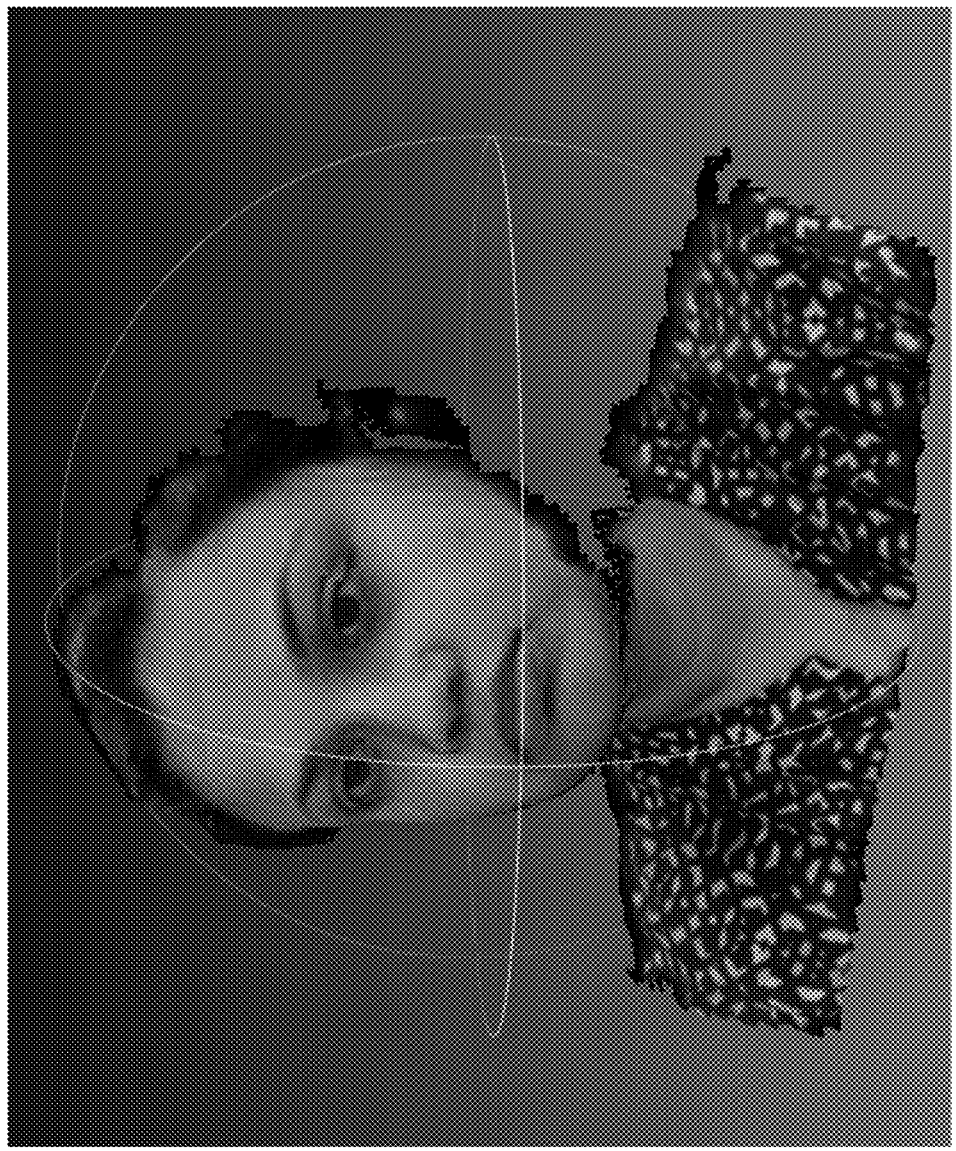
FIG. 5 is an exemplary textured and animated 3D avatar model generated by the system.

FIG. 5 is an exemplary textured and animated 3D avatar model 500 generated by the system 100. As shown in FIG. 5, the 3D avatar model comprises a front side of the face and upper body, with the back side to be completed using a generic 3D model.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more specialized processors executing a computer program to perform functions by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the technology may be embodied in other specific forms without departing from the spirit or essential characteristics thereof. The foregoing embodiments are therefore to be considered in all respects illustrative rather than limiting of the technology described herein.

What is claimed is:

1. A system for remote visualization of three-dimensional (3D) animation with synchronized voice in real-time, the system comprising:
   a mobile computing device comprising a sensor device that captures a plurality of scans of one or more non-rigid objects in a scene, each scan comprising (i) a depth map and (ii) a color image;
   one or more remote computing devices, each comprising a display device that renders and animates 3D models in real-time;
   a server computing device coupled to the mobile computing device and the one or more remote computing devices, the server computing device comprising a memory that stores computer-executable instructions and a processor that executes the instructions to:
      receive a first set of one or more scans from the mobile computing device;
      reconstruct an initial 3D model of the one or more non-rigid objects using the first set of one or more scans, comprising, for each scan in the first set of one or more scans:
         converting the depth map to an input 3D model point cloud;
         determining whether the depth map corresponds to a first scan of the first set of one or more scans;
         when the depth map does not correspond to a first scan, performing a non-rigid match of an existing 3D model point cloud to the input 3D model point cloud;
         integrating the input 3D model point cloud to a truncated signed distance function (TSDF) 3D model;
         generating a 3D mesh from the TSDF 3D model;
         deforming the 3D mesh to a coordinate system associated with the input 3D model point cloud;
         rasterizing the deformed 3D mesh to the existing 3D model point cloud;
         generating an output 3D mesh from the rasterized 3D mesh using the TSDF 3D model; and
         creating an initial 3D model of the one or more non-rigid objects using the output 3D mesh;
      receive a second set of one or more scans from the sensor device;
      for each scan in the second set of one or more scans:
         determine an initial alignment between the depth map of the scan and the initial 3D model by mapping one or more landmark points in the depth map to one or more landmark points in the initial 3D model;
         convert the depth map of the scan into a coordinate system of the initial 3D model;
         determine one or more displacement values between a location of each landmark point in the depth map and a location of the corresponding landmark point in the initial 3D model;
         deform the initial 3D model to the depth map using the displacements;
         apply a texture to at least a portion of the deformed 3D model based upon the color image of the scan; and
         transmit the textured deformed 3D model and the displacement values to one or more of the remote computing devices for display on one or more of the display devices, wherein the display devices render the textured deformed 3D model and animate the textured deformed 3D model in real-time using the displacement values.

2. The system of claim 1, wherein converting the depth map to an input 3D model point cloud comprises projecting the depth map using a depth camera intrinsic matrix.

3. The system of claim 1, wherein reconstructing an initial 3D model of the one or more non-rigid objects using the first set of one or more scans further comprises generating a normal of each point in the input 3D model point cloud by eigen value decomposition.

4. The system of claim 1, wherein integrating the input 3D model point cloud to a truncated signed distance function (TSDF) 3D model comprises:
   deforming the TSDF model to a coordinate system of the input 3D model point cloud using a deformation tree;
   projecting one or more TSDF voxels to the input 3D model point cloud to obtain a projection distance for each of the one or more TSDF voxels; and
   updating a TSDF value in each of the one or more TSDF voxels based on the corresponding projection distance.

5. The system of claim 1, wherein generating a 3D mesh from the TSDF 3D model is based upon a marching cube algorithm.

6. The system of claim 1, wherein the one or more landmark points in the depth map and the one or more landmark points in the initial 3D model each correspond to one or more facial features of a person's face.

7. The system of claim 6, wherein the one or more facial features comprise a corner of an eye or a tip of the nose.

8. The system of claim 1, wherein mapping one or more landmark points in the depth map to one or more landmark points in the initial 3D model is based upon an iterative closest point (ICP) algorithm.

9. The system of claim 1, wherein applying a texture to at least a portion of the deformed 3D model based upon the color image of the scan comprises:
   segmenting the deformed 3D model into a plurality of portions; and
   applying the texture to only one portion of the deformed 3D model.

10. The system of claim 9, wherein the texture is applied to a front face portion of the deformed 3D model.

11. The system of claim 1, the mobile computing device further comprising an audio capture device, wherein:
   the mobile computing device uses the audio capture device to record audio data associated with the one or more non-rigid objects during capture of the plurality of scans by the sensor device, and the mobile computing device transmits the audio data to the server computing device;
   the server computing device synchronizes the audio data with the displacement values and transmits the synchronized audio data to the remote computing devices; and
   the remote computing devices play the synchronized audio data when animating the textured deformed 3D model.

12. The system of claim 1, wherein the server computing device transmits the textured deformed 3D model and the displacement values to the mobile computing device, and the mobile computing device renders the textured deformed 3D model and animates the textured deformed 3D model in real-time using the displacement values.

13. A computerized method of remote visualization of three-dimensional (3D) animation with synchronized voice in time, the method comprising:
   capturing, by a sensor device coupled to a mobile computing device, a plurality of scans of one or more non-rigid objects in a scene, each scan comprising (i) a depth map and (ii) a color image;
   receiving, by a server computing device coupled to the mobile computing device, a first set of one or more scans from the mobile computing device;
   reconstructing, by the server computing device, an initial 3D model of the one or more non-rigid objects using the first set of one or more scans, comprising, for each scan in the first set of scans:
      converting the depth map to an input 3D model point cloud;
      determining whether the depth map corresponds to a first scan of the first set of one or more scans;
      when the depth map does not correspond to a first scan, performing a non-rigid match of an existing 3D model point cloud to the input 3D model point cloud;
      integrating the input 3D model point cloud to a truncated signed distance function (TSDF) 3D model;
      generating a 3D mesh from the TSDF 3D model;
      deforming the 3D mesh to a coordinate system associated with the input 3D model point cloud;
      rasterizing the deformed 3D mesh to the existing 3D model point cloud;
      generating an output 3D mesh from the rasterized 3D mesh using the TSDF 3D model; and
      creating an initial 3D model of the one or more non-rigid objects using the output 3D mesh;
   receiving, by the server computing device, a second set of one or more scans from the sensor device;
   for each scan in the second set of one or more scans:
      determining, by the server computing device, an initial alignment between the depth map of the scan and the initial 3D model by mapping one or more landmark points in the depth map to one or more landmark points in the initial 3D model;
      converting, by the server computing device, the depth map of the scan into a coordinate system of the initial 3D model;
      determining, by the server computing device, a displacement between a location of each landmark point in the depth map and a location of the corresponding landmark point in the initial 3D model;
      deforming, by the server computing device, the initial 3D model to the depth map using the displacements;
      applying, by the server computing device, a texture to at least a portion of the deformed 3D model based upon the color image of the scan; and
      transmitting, by the server computing device, the textured deformed 3D model to the mobile computing device for display.

14. The method of claim 13, wherein converting the depth map to an input 3D model point cloud comprises projecting the depth map using a depth camera intrinsic matrix.

15. The method of claim 13, wherein reconstructing an initial 3D model of the one or more non-rigid objects using the first set of one or more scans further comprises generating, by the server computing device, a normal of each point in the input 3D model point cloud by eigen value decomposition.

16. The method of claim 13, wherein integrating the input 3D model point cloud to a truncated signed distance function (TSDF) 3D model comprises:

deforming the TSDF model to a coordinate system of the input 3D model point cloud using a deformation tree;

projecting one or more TSDF voxels to the input 3D model point cloud to obtain a projection distance for each of the one or more TSDF voxels; and updating a TSDF value in each of the one or more TSDF voxels based on the corresponding projection distance.

17. The method of claim 13, wherein generating a 3D mesh from the TSDF 3D model is based upon a marching cube algorithm.

18. The method of claim 13, wherein the one or more landmark points in the depth map and the one or more landmark points in the initial 3D model each correspond to one or more facial features of a person's face.

19. The method of claim 18, wherein the one or more facial features comprise a corner of an eye or a tip of the nose.

20. The method of claim 13, wherein mapping one or more landmark points in the depth map to one or more landmark points in the initial 3D model is based upon an iterative closest point (ICP) algorithm.

21. The method of claim 13, wherein applying a texture to at least a portion of the deformed 3D model based upon the color image of the scan comprises:

segmenting the deformed 3D model into a plurality of portions; and applying the texture to only one portion of the deformed 3D model.

22. The method of claim 21, wherein the texture is applied to a front face portion of the deformed 3D model.

23. The method of claim 13, the mobile computing device further comprising an audio capture device, the method further comprising:

recording, by the audio capture device of the mobile computing device, audio data associated with the one or more non-rigid objects during capture of the plurality of scans by the sensor device;

transmitting, by the mobile computing device, the audio data to the server computing device;

synchronizing, by the server computing device, the audio data with the displacement values;

transmitting, by the server computing device, the synchronized audio data to the remote computing devices; and playing, by the remote computing devices, the synchronized audio data when animating the textured deformed 3D model.

24. The method of claim 13, wherein the server computing device transmits the textured deformed 3D model and the displacement values to the mobile computing device, and the mobile computing device renders the textured deformed 3D model and animates the textured deformed 3D model in real-time using the displacement values.

* * * * *